(12) United States Patent
Li et al.

(10) Patent No.: US 11,172,503 B2
(45) Date of Patent: Nov. 9, 2021

(54) SPS FOR SIGNALING WITH NON-INTEGER PERIODICITIES

(71) Applicant: QUALCOMM Incorporated, San Diego, CA (US)

(72) Inventors: Junyi Li, Chester, NJ (US); Vinay Joseph, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/565,371

(22) Filed: Sep. 9, 2019

(65) Prior Publication Data
US 2020/0092908 A1     Mar. 19, 2020

Related U.S. Application Data

(60) Provisional application No. 62/733,486, filed on Sep. 19, 2018.

(51) Int. Cl.
*H04L 29/08* (2006.01)
*H04W 4/02* (2018.01)
(Continued)

(52) U.S. Cl.
CPC ............. *H04W 72/14* (2013.01); *H04L 41/08* (2013.01); *H04W 72/0446* (2013.01)

(58) Field of Classification Search
None
See application file for complete search history.

(56) References Cited

U.S. PATENT DOCUMENTS 8,634,364 B2 * 1/2014 Barbieri ................ H04W 16/14
                                                         370/329
9,584,267 B2 * 2/2017 Park ........................ H04L 5/14
(Continued)

FOREIGN PATENT DOCUMENTS

EP          3531779 A1     8/2019
WO       2018147579 A1     8/2018
WO   WO-2019219926 A1 * 11/2019 .......... H04W 72/042

OTHER PUBLICATIONS

Huawei, et al., "Reliability Enhancement for Grant-Free Transmission", 3GPP TSG WG1 Meeting #92, 3GPP Draft, R1-1801787, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397761, 6 Pages, Retrieved from the Internet: URL: http://www.3gpp.org/ftp/tsg%5Fran/WG1%5FRL1/TSGR1%5F92/Docs/ [retrieved on Feb. 17, 2018], Section 4, p. 3, Lines 8-18.
(Continued)

*Primary Examiner* — Sithu Ko
(74) *Attorney, Agent, or Firm* — Procopio, Cory, Hargreaves & Savitch LLP

(57) ABSTRACT

The apparatus identifies a first periodicity for packet generation or packet transmission. A base station provides a UE with a configuration for a Semi-Persistent Scheduling (SPS), a Configured Scheduling (CS), or a Configured Grant (CG) based on a non-integer relationship between the first periodicity and a duration of a scheduling unit in which the SPS, the CS, or the CG is scheduled. Then, the apparatus transmits or receives communication based on the received configuration.

28 Claims, 14 Drawing Sheets

(51) Int. Cl.
*H04W 72/14* (2009.01)
*H04W 72/04* (2009.01)
*H04L 12/24* (2006.01)

(56) References Cited

U.S. PATENT DOCUMENTS

| | | | |
|---|---|---|---|
| 2015/0282148 A1* | 10/2015 | Le | H04W 72/0406 |
| | | | 370/329 |
| 2016/0295624 A1* | 10/2016 | Novlan | H04W 72/04 |
| 2017/0265182 A1* | 9/2017 | Guo | H04W 72/0413 |
| 2018/0103460 A1* | 4/2018 | Sharma | H04W 72/14 |
| 2018/0160445 A1* | 6/2018 | Babaei | H04W 72/14 |
| 2019/0045507 A1* | 2/2019 | Sorrentino | H04W 72/042 |
| 2019/0116609 A1* | 4/2019 | Feng | H04W 4/46 |
| 2020/0068537 A1* | 2/2020 | Oh | H04L 5/0007 |

OTHER PUBLICATIONS

International Search Report and Written Opinion—PCT/US2019/050449—ISA/EPO—dated Nov. 19, 2019.

\* cited by examiner

SPS FOR SIGNALING WITH NON-INTEGER PERIODICITIES

CROSS REFERENCE TO RELATED APPLICATION(S)

This application claims the benefit of U.S. Provisional Application Ser. No. 62/733,486, entitled "SPS for Signaling with Non-Integer Periodicities" and filed on Sep. 19, 2018, which is expressly incorporated by reference herein in its entirety.

BACKGROUND

Technical Field

The present disclosure relates generally to communication systems, and more particularly, to Semi-Persistent Scheduling (SPS), Configured Scheduling (CS), and Configured Grant (CG).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus identifies a first periodicity for packet generation at a User Equipment (UE) or packet transmission from a base station. The apparatus receives a configuration of a Semi-Persistent Scheduling (SPS), a Configured Scheduling (CS), or a Configured Grant (CG) based on a non-integer relationship between the first periodicity and a duration of a scheduling unit in which the SPS, the CS, or the CG is scheduled. Then, the apparatus transmits or receives packets based on the configuration for the SPS, the CS, or the CG.

In another aspect of the disclosure, a method, a computer-readable medium, and an apparatus are provided. The apparatus identifies a first periodicity for packet generation at a User Equipment (UE) or packet transmission by a base station. The UE transmits a configuration to the UE of an SPS, a CS, or a CG based on a non-integer relationship between the first periodicity and a duration of a scheduling unit in which the SPS, the CS, or the CG is scheduled. Then, the apparatus receives or transmits packets based on the configuration for the SPS, the CS, or the CG.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
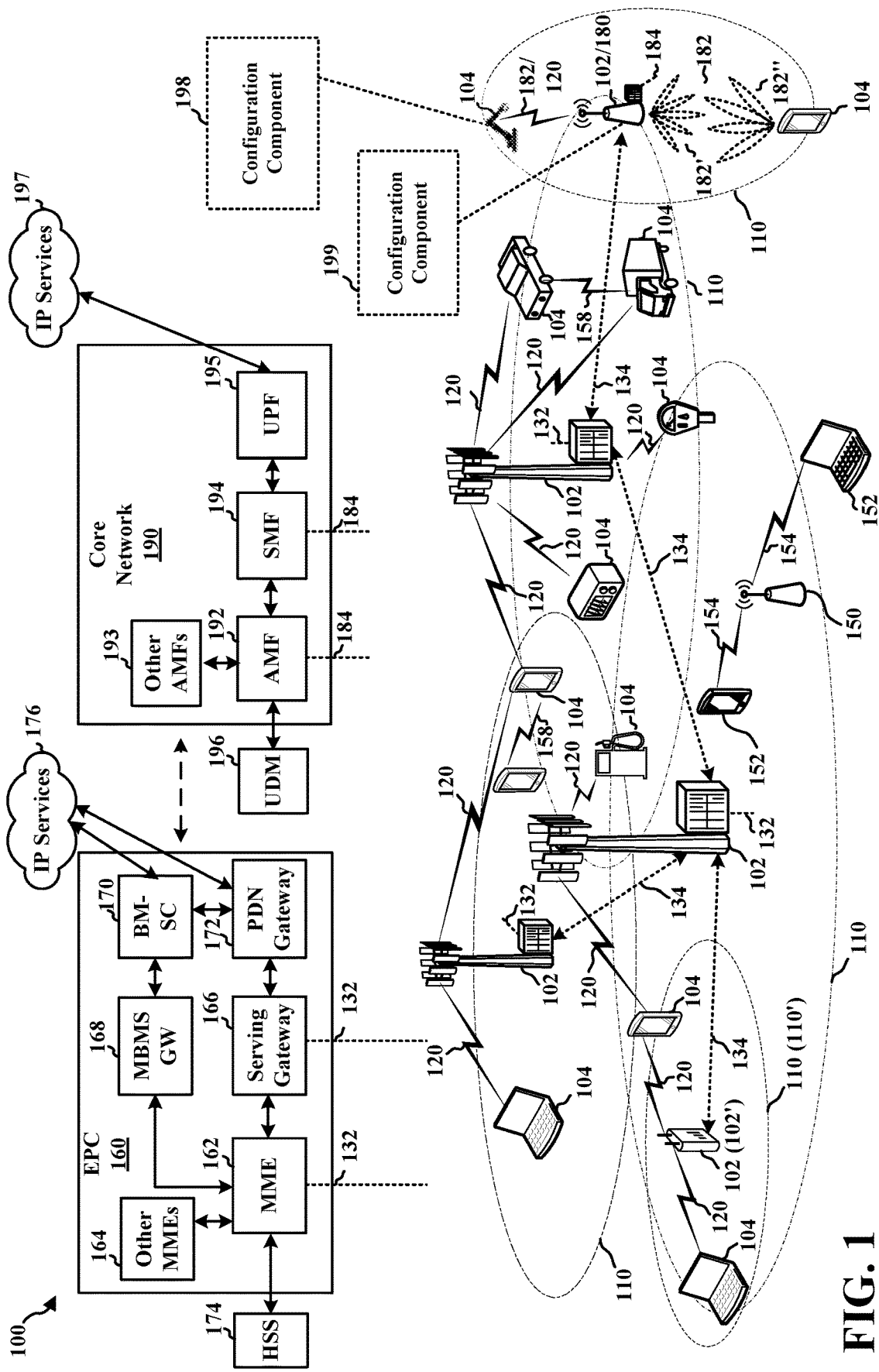
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a configuration component 198 configured to receive a configuration for an SPS, CS, and/or CG based on a non-integer relationship between the first periodicity for packet generation at the UE 104 or packet transmission from the base station 102, 180 and a duration of a scheduling unit in which the SPS, the CS, or the CG is scheduled. The UE 104 may receive or transmit packets based on the received configuration for the SPS, CS, or CG. As well, a base station 102, 180 may include a configuration component 199 configured to provide a configuration for an SPS, CS, and/or CG for the UE 104 based on the non-integer relationship between the first periodicity for packet generation at the UE 104 or for packet transmission by the base station 102, 180 and a duration of a scheduling unit in which the SPS, the CS, or the CG is scheduled. The base station may further receive or transmit packets based on the configuration. In some examples, the communication between the base station 102, 180 and the UE 104 may be based on 5G NR communication. In other examples, the communication may be based on LTE. The communication may be performed in connection with factory automation, e.g., and may comprise Industry IoT (IIoT). Thus, the UE 104 may comprise a sensor, an actuator, a piece of industrial equipment, etc. The base station 102, 180 may comprise a Programmable Logic Controller (PLC) that receives information from the UE and provides commands to factory equipment. For example, PLC(s) may automate control of machines and control systems, e.g., of industrial electromechanical processes, such as control of machinery on factory assembly lines, amusement rides, light fixtures, etc. Although the following description may provide examples using 5G NR, the concepts described herein may be applicable to other similar areas, such as LTE, LTE-A, CDMA, GSM, and other wireless technologies.

Figure 2:
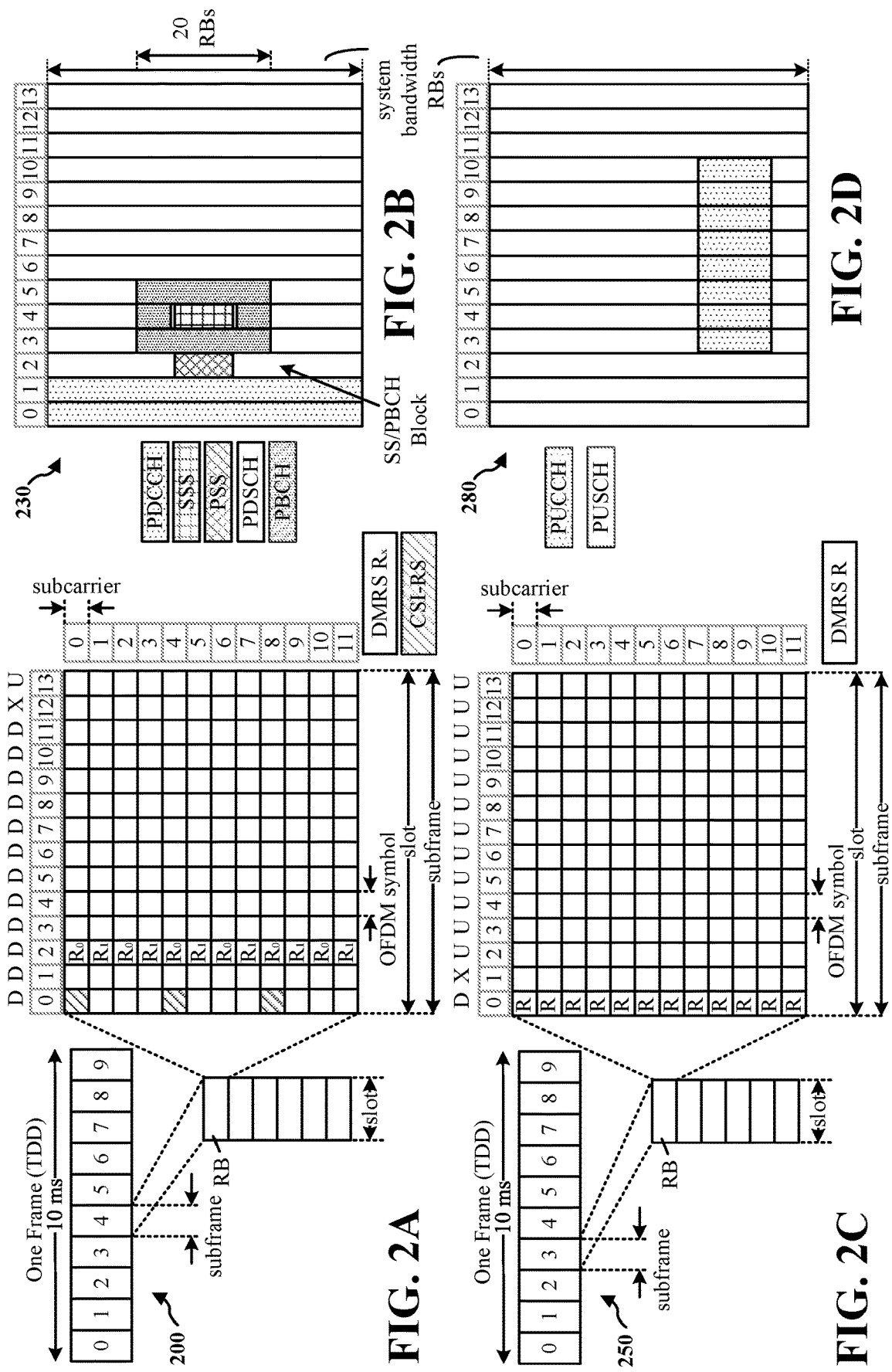
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
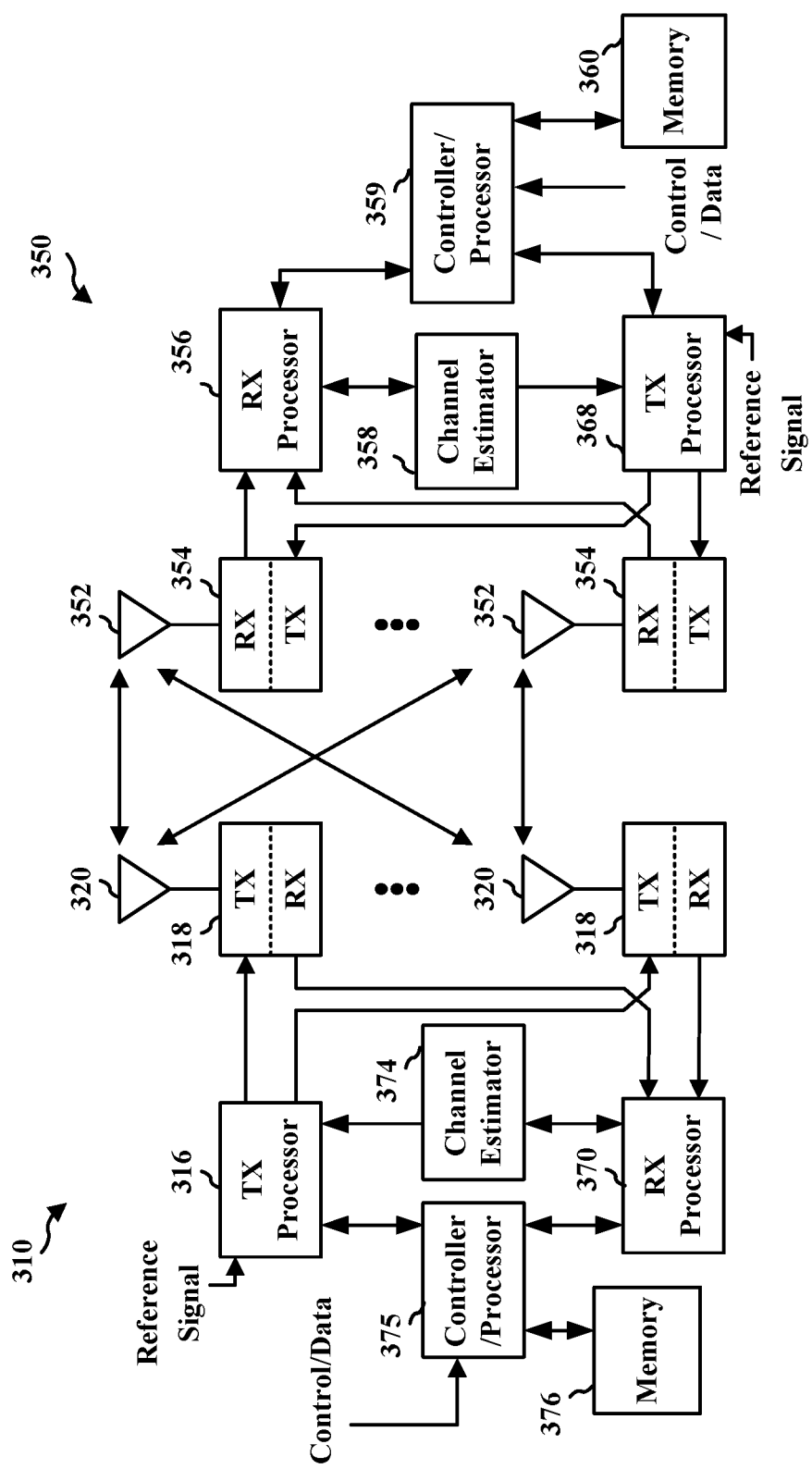
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4A:
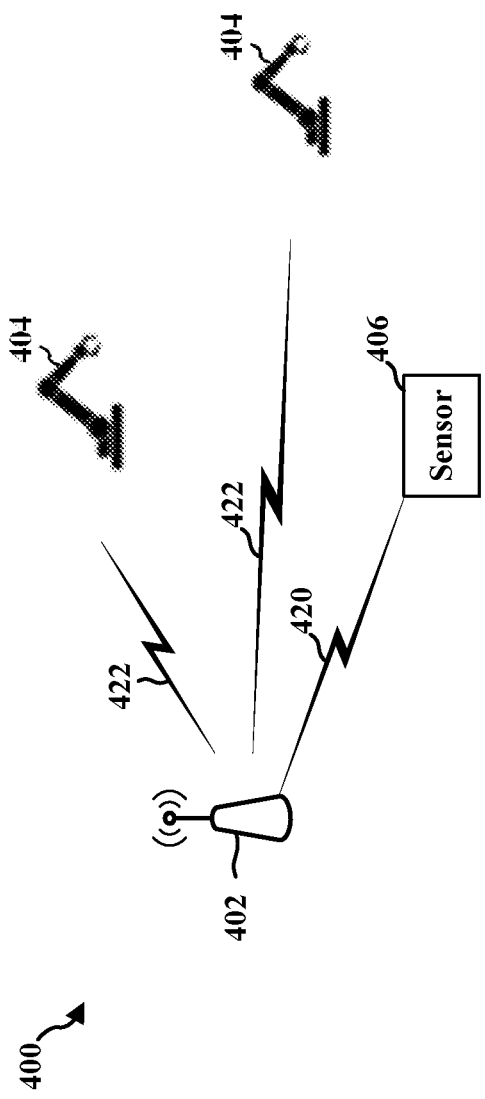
FIG. 4A illustrates an example of communication in factory automation.

FIG. 4A illustrates an example system 400 of wireless communication between a PLC 402 and multiple UEs 404, 406. The communication may be based on Industry IoT (IIoT). The PLC may receive information, e.g., in wireless signals 420, from sensors, actuators, etc. 406 and may provide commands in wireless signals 422 to factory equipment 404. Although the sensor/actuator 406 is illustrated as being separate from the factory equipment 404, in other examples, the sensor/actuator 406 may be comprised in or positioned at a piece of factory equipment 404. The PLC may comprise a base station, e.g., similar to base station 102 or 180 in FIG. 1. In some examples, the base station may be a gNB. The PLC 402 may automate control of machines and control systems, e.g., of industrial electromechanical processes, such as control of machinery on factory assembly lines, amusement rides, light fixtures, etc.

Figure 4B:
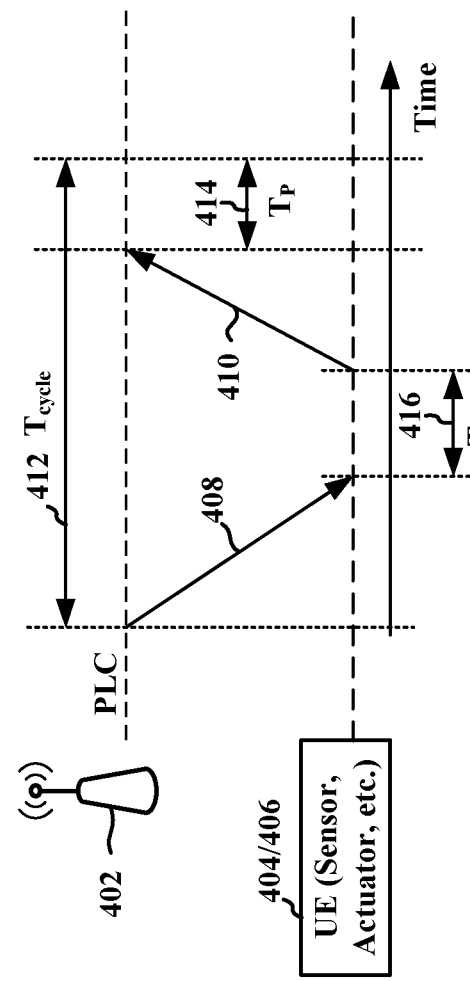
FIG. 4B illustrates an example of periodic communication between a UE and a base station.

FIG. 4B illustrates an example of periodic traffic that may be received by the PLC 402. The PLC 402 may transmit a command 408 or other communication to sensor/actuator 406 or equipment 404. The sensor/actuator 406 or equipment 404, may receive the communication, e.g., command 408, and take an action based on the command. Following the action, the sensor actuator 406 or the equipment 404 may transmit communication 410 back to the PLC 402. For example, a sensor may respond with location information, temperature information, etc. The sensor may report back to the PLC a result that occurs due to action from a command received from the PLC. The report may comprise an acknowledgement, e.g., a simple application layer acknowl- edgment. As well, the sensor may report a current status of the sensor following a command, e.g., an updated location, etc. There may be a processing time duration TAS, e.g., an actuation and/or sensing duration between receipt of the command 408 and transmission of the communication 410. Following the PLC's receipt of the communication 410 from the actuator/sensor 406 or the equipment 404, there may be a processing duration $T_P$ during which the PLC 402 processes the received information, e.g., communication 410, and before the PLC 402 sends additional communication/commands to the actuator/sensor 406 or the equipment 404. Thus, the total cycle may have a duration $T_{cycle}$. Following the duration $T_P$, the PLC 402 may send an additional command/communication 408 and the cycle may repeat. Therefore, the system may need to accommodate periodic, regular traffic between PLC 402 and sensor/actuator 406 or the equipment 404, e.g., DL traffic from the PLC 402 to the sensor/actuator 406 or the equipment 404 and UL traffic from the sensor/actuator 406 or the equipment 404 to the PLC 402. Such communication may correspond to communication between a base station and UE(s). For example, the sensor/actuator 406 and the equipment 404 may each be referred to as a UE. The PLC may be referred to as a base station. In systems relying on URLLC, the communication may need to achieve low latency requirements and high reliability requirements, e.g., no more than 1 ms of latency and at least 99.9999% reliability.

A control channel, e.g., PDCCH, may be used by the PLC to grant resources to a sensor/actuator 406 or the equipment 404 for use in transmitting the periodic UL communication, e.g., 410. However, for regular communication between a PLC and sensor/actuator 406 or equipment 404, the PDCCH transmissions with grants from the PLC 402 may create a bottleneck. Factory automation may involve a higher UE density, e.g., approximately 1 UE per $m^2$. Therefore a large number of UEs 404 or 406 may need to communicate with the base station (e.g., PLC 402). Sending a dynamic grant, e.g., one DCI per slot, to each of the large number of UEs would place a large burden on PDCCH overhead. Semi-Persistent Scheduling (SPS) may be used to reduce the overhead requirements of PDCCH by enabling the UEs to be granted resources in a semi-persistent or periodic manner. SPS may be used to schedule resources for receiving downlink communication. The SPS may be communicated to each UE using RRC signaling and/or DCI. As well, a periodic grant of resources for UL communication can be provided to the UE(s) using Configured Scheduling (CS) or a Configured Grant (CG).

When a base station configures SPS radio resources, a UE can employ the periodic resources for UL transmissions without an additional scheduling request procedure. Thus, when the UE has data to send, the UE can buffer the data and transmit the data via the next periodic resource that is already configured for the UE. The SPS is dedicated to a particular UE. If the UE does not need the periodic resources, the SPS resources are not employed by the UE and are wasted. In CG, e.g., Type 1 CG, multiple UEs may be able to share a periodic resource scheduled for UL transmissions. A base station may configure a CG of periodic resources to be shared by multiple UEs, and the UEs may randomly use the resources when they have data to transmit. The CG may reduce packet transmission delay by avoiding the need for a scheduling request procedure. As the resources may be shared among multiple UEs, the likelihood of utilization of the assigned resources may be higher than for SPS. In addition to or alternately from SPS and CG, the UL resources may be scheduled for the UE(s) using Type 2 Configured Scheduling (CS).

The following examples will be described in connection with SPS, but are also applicable to Type 1 CG and Type 2 CS.

An SPS period is typically expressed as an integer number of slots or mini-slots. For example, for DL communication, the SPS period may correspond to an integer multiple of DL centric slots. DL centric slots may be slots reserved for DL communication. Similarly, for UL communication, the SPS period may be expressed as an integer multiple of UL centric slots, e.g., slots reserved for UL communication.

However, the period for the generation of packets, such the factory automation packets described in connection with FIGS. 4A and 4B might not be expressible as an integer number of slots or mini-slots. As well, it may be difficult to adjust the factory automation traffic to align with the SPS periodicities. This leads to a challenge in providing SPS, CG, or CS to UEs, e.g., when $T_{cycle}$ does not have an integer relationship to the unit used to schedule the SPS. For example, when $T_{cycle}$ is a non-integer multiple of the duration of the slot, mini-slot, UL centric slot, DL centric slot, symbols, or other scheduling duration in which the SPS, CG, or CS is scheduled.

Figure 5:
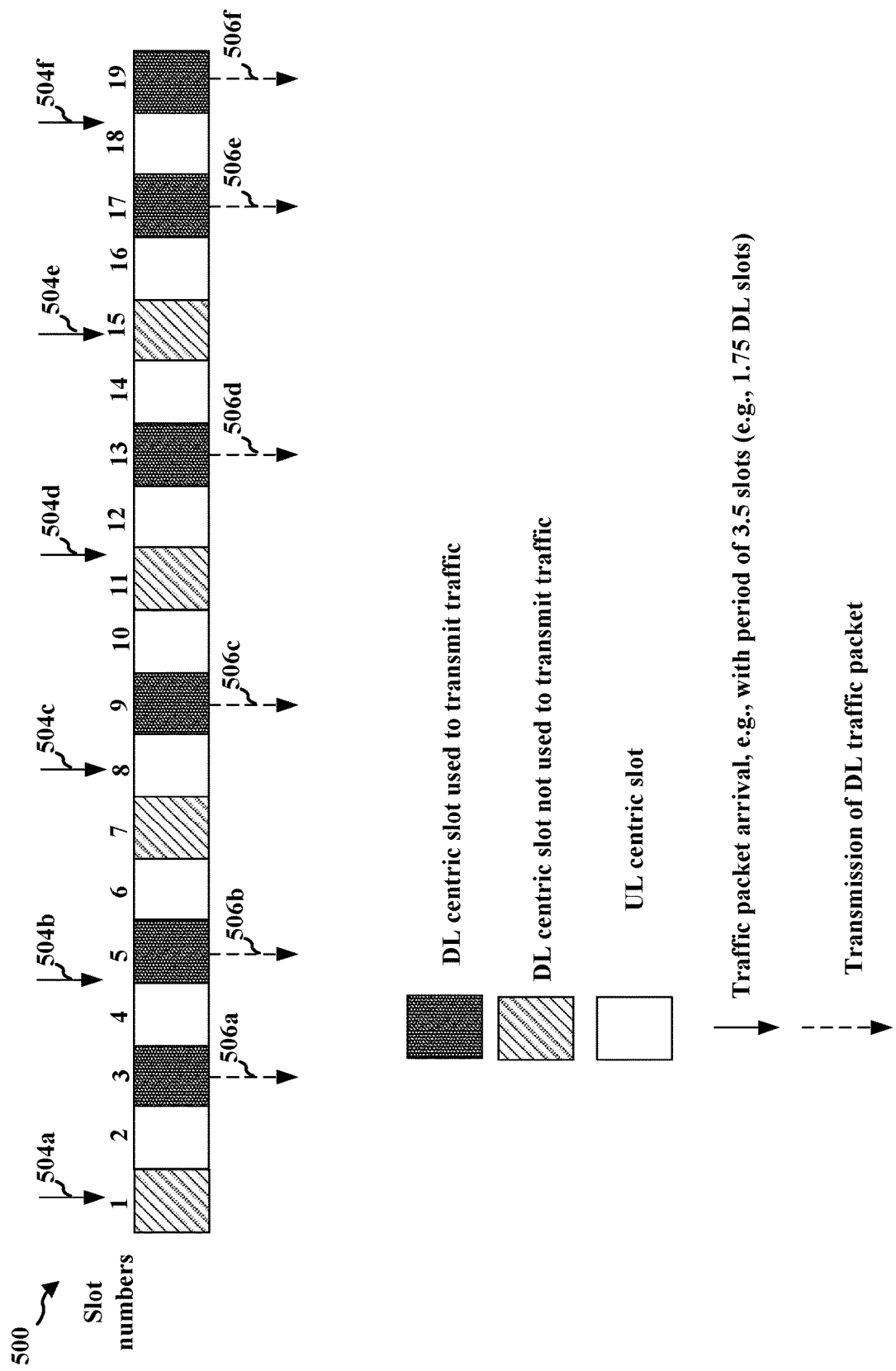
FIG. 5 illustrates an examples of resources used for communication between a base station and a UE.

FIG. 5 illustrates an example resource structure 500 of alternating DL and UL centric slots and a traffic generation cycle that has a non-integer relationship to the alternating pattern of DL and UL centric slots. The traffic may comprise factory automation data packets. The data packets may be communicated, e.g., based on IIoT. In the illustrated example, the data 504a, 504b, 504c, 504d, 504d, 504e, 504f arrives with a period of 3.5 slots or 1.75 DL centric slots. Thus, if the SPS is scheduled using units of slots or of DL centric slots, the data traffic 504a-f does not line up with the units, e.g., slots, used to schedule SPS. In the illustrated example, traffic is ready to be transmitted in slot 3, 5, 9, 13, 17, and 19. There is a duration of 2 slots between slot 3 and slot 5, followed by a duration of 4 slots between each of slots 5 and 9, slots 9 and 13, and slots 13 and 14. Then, a duration of only 2 slots occurs between slot 17 and slot 19. This creates a problem in configuring an SPS grant for DL transmission of the traffic because the spacing between traffic transmission 506a, 506b, 506c, 506d, 506e, and 506f varies due to the non-integer relationship between the period of traffic generation and the duration of the slots, e.g., with traffic generated every 3.5 slots. Although this problem is described in connection with periodic DL traffic, similar problems may occur for periodic UL traffic that is generated with a non-integer relationship to the unit used to scheduled SPS.

As presented herein, the base station may configure UE(s) using SPS, CS, and/or CG based on the non-integer relationship between the periodicity of the traffic generation and the periodicity of the unit used to schedule the SPS, CS, CG, etc. Such an SPS may be referred to as an enhanced SPS. In some examples, the unit used to schedule SPS, CS, and/or CG a slot or a mini-slot. In other examples, the unit may comprise DL centric slots or UL centric slots. In other examples, the unit may comprise a symbol or a plurality of symbols. In other examples, the unit may comprise a pre-configured time duration.

Figure 6A:
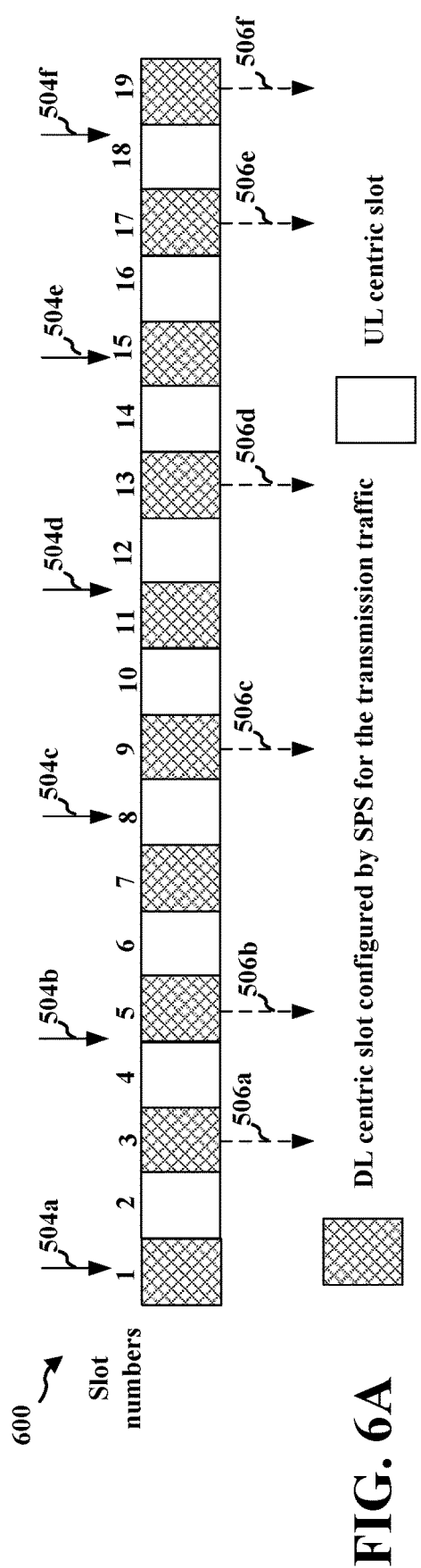
FIGS. 6A and 6B illustrate examples of resources used for communication between a base station and a UE.

In a first aspect, the base station may configure the SPS by rounding the traffic generation period down to the next lowest integer. Thus, in the example in FIG. 5, if the scheduling unit is DL centric slots, the base station may round from 1.75 DL centric slots down to 1 DL centric slots. Thus, the SPS would be configured to allow DL traffic transmission every DL centric slot. FIG. 6A illustrates an example configuration 600 with SPS configured every DL slot and using the same generation of data traffic 504a-f from the example of FIG. 5. As well, the DL transmissions 506a-e use the same reference numbers as for FIG. 5. In the example in FIG. 6A, a configuration of every DL centric slot would waste slots, e.g., slots 7, 11, and 15 would be included in the SPS configuration, but would not be used for traffic transmission.

Figure 6B:
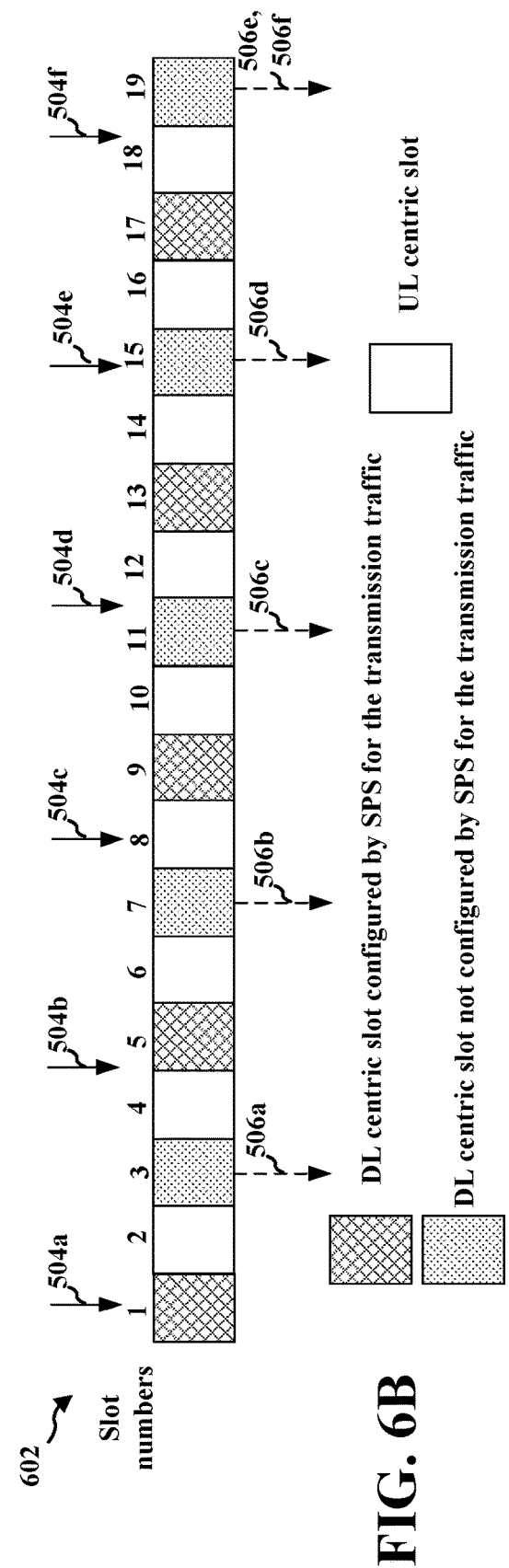

In a second aspect, the base station may configure the SPS by rounding the traffic generation period up to the next highest integer. Thus, in the example in FIG. 5, if the scheduling unit is DL centric slots, the base station may round from 1.75 DL centric slots up to 2 DL centric slots. Thus, the SPS may be configured to allow DL traffic transmission every 2 DL centric slots. FIG. 6B illustrates an example 602 in which the SPS configuration enables DL traffic transmission every 2 DL centric slots. In the example in FIG. 6B, a configuration of every 2 DL centric slots would lead to delays in the transmission of DL traffic. For example, data traffic 504b that is generated at the end of slot 4 would have to wait until slot 7 to be transmitted. Similarly, transmissions 506c and 506d will experience additional delays from the SPS configuration of FIG. 6A. Furthermore, transmission 506e of data 504e is delayed until after the next periodic data 504f is generated. Thus, by the transmission occasion in slot 19 both 504e and 504f may be buffered and waiting for transmission. The delay introduced between the arrival/generation of data 504a-f and the transmission occasions provided for DL transmissions 506a-f might not meet the latency requirements for URLLC.

Figure 7:
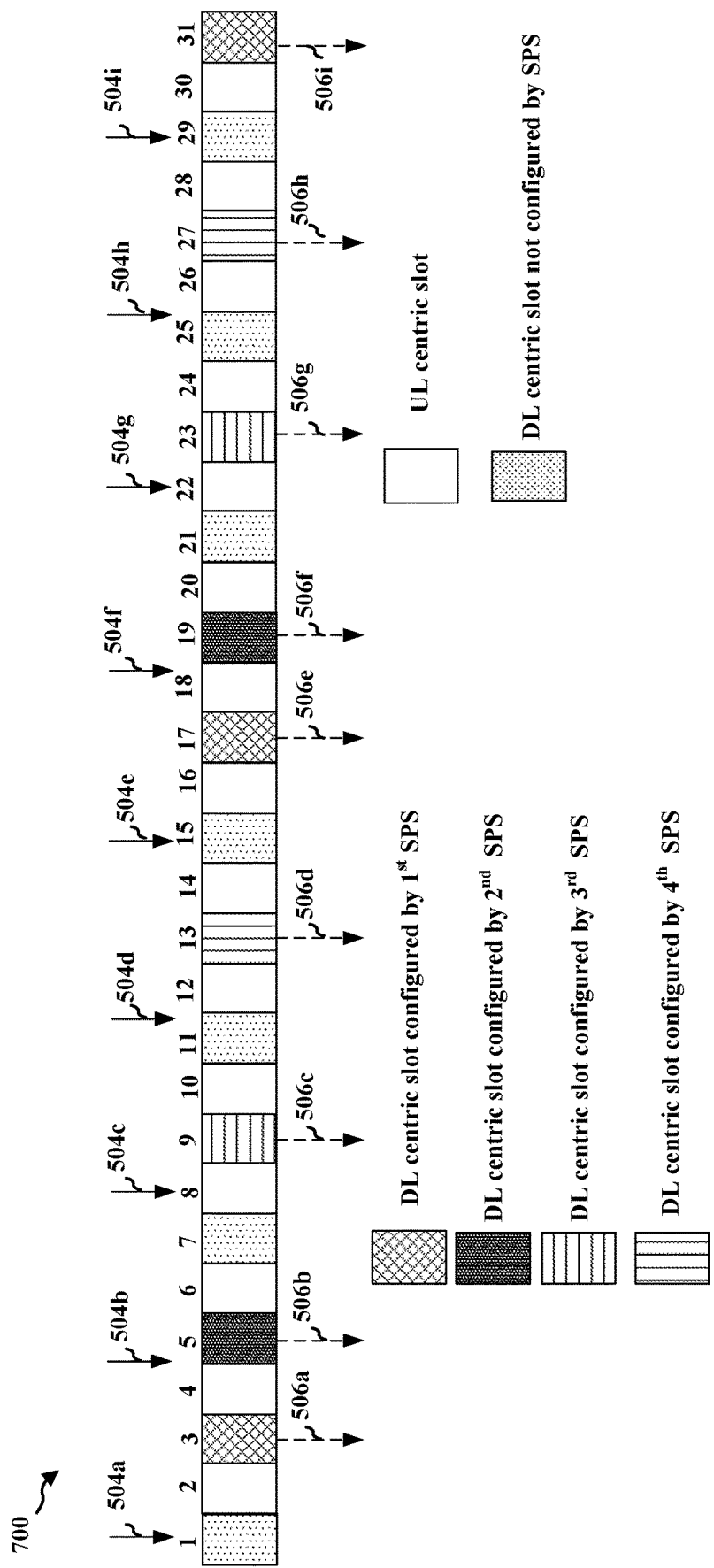
FIG. 7 illustrates an example configuration of multiple SPSs.

In a third aspect, multiple periodic SPSs can be configured based on the non-integer relationship between the periodicity of the traffic generation and the periodicity of the unit used to schedule the SPS. The base station may determine sub-sequences comprised in the pattern of traffic that are periodic. Then, an SPS can be generated for each of the periodic sub-sequences. In the example in FIG. 5, there are four periodic sub-sequences, e.g., a periodic sub-sequence beginning at slot 3 and having a transmission occasion every 14 slots or every 7 DL centric slots, so that the sub-sequence includes slots 3, 17, 31, etc. A second sub-sequence begins at slot 5 and has a period of every 14 slots or every 7 DL centric slots, e.g., including slots 5, 19, 33, etc. A third sub-sequence begins at slot 9 and has a period of every 14 slots or every 7 DL centric slots, e.g., including slots 9, 23, 37, etc. A fourth sub-sequence begins at slot 13 and has a period of every 14 slots or every 7 DL centric slots, e.g., including slots 13, 27, 41, etc. FIG. 7 illustrates an example 700 showing multiple periodic SPSs, one configured for each sub-sequence. Through the use of multiple periodic SPS configurations, a transmission occasion can be provided for each DL centric slot in which DL traffic is ready for transmission based on the 1.75 DL centric slot pattern. The example 700 avoids the problems of the example in FIG. 6B in which a delay occurs between the time at which traffic becomes available for transmission and the transmission occasion at which the data. In FIG. 7, data 504a-504i is able to be transmitted in the next DL centric slot after it becomes available, e.g., as DL transmissions 506b-i. As well, the use of multiple, periodic SPS configurations avoids overprovisioning for DL transmissions so that DL resources are not wasted, e.g., slots 1, 7, 11, 15, 21, 25, and 29 are not configured by an SPS. The use of multiple SPS configurations may, at times, lead to a large amount of signaling overhead. While the example of a traffic generation period that has a duration of 1.75 DL centric slots requires four SPSs to be configured, in another example in which the traffic generation periodicity is 0.55 ms and the slot duration is 0.5 ms, the pattern would lead to 10 periodic sub-sequences. Thus, 10 different SPSs would need to be configured to provide transmission occasions for the traffic. The greatest common denominator (GCD) of 0.5 and 0.55 is 0.05. For the slot duration/GCD=0.5/0.05=10. Thus, there will be 10 periodic sub-sequences, each needing a different SPS.

In a fourth aspect, a non-periodic SPS may be configured based on the non-integer relationship between the periodicity of the traffic generation and the periodicity of the unit used to schedule the SPS. The term non-periodic SPS is used herein to describe an SPS with non-periodic SPS transmission occasions. A periodic SPS involves SPS transmission occasions that are periodic, e.g., that share a same period between transmission occasions. The base station may configure a single, non-periodic SPS for the UE. The base station may indicate a packet generation periodicity, p, as a rational number corresponding to numerator, m, and a denominator, n. Thus, p=m/n. In the example of FIG. 5, the periodicity of 3.5 slots would be p that can be represented with m=7 and n=2, such that p=m/n=7/2=3.5. Thus, m and n are a pair of positive integers that can be used to indicate the packet generation periodicity p. An example for determining an nth transmission occasion will be described using a slot as the scheduling unit. However, the described aspects may be similarly applied using a mini-slot, a symbol, a set of symbols, DL centric slots, UL centric slots, or some other predefined time duration as the scheduling unit for the SPS. An $n^{th}$ transmission occasion for the non-periodic SPS may be determined, for example, as a first slot after a time based on n*p*T, where T is a duration of the scheduling unit for the SPS. Thus, in the example in which the scheduling unit is a slot, T will be a duration of a slot. If the scheduling unit is a mini-slot, T will be the duration of a mini-slot, and so forth for other scheduling units used for the SPS. The $n^{th}$ transmission occasion may be further based on an offset, e.g., such that the SPS is determined to be the first slot after a time based on n*p*T+offset. The offset may be indicative of a starting time of the SPS of a specific UE, e.g., different UEs may have similar SPSs, but may each have different offset values so that a base station can support multiple UEs in a TDM manner. The offset may be indicated in the SPS configuration. In another example, the offset may be preconfigured. The offset may be based at least in part on a delay between packet generation and packet transmission, e.g., at a UE. For instance, the offset may be adjusted (e.g., increased) to account for a delay or estimates of a delay between packet generation at the UE until the time when packet can be transmitted by the UE. The delay between packet generation at UE and the time when the packet can be transmitted may include processing times such as L2 processing times, an N2 processing time (e.g., a minimum processing time between a DCI and first symbol of associated PUSCH) or a K2 processing time (e.g., a processing time between a DCI and first symbol of associated PUSCH). In some aspects, the delay between packet generation at UE and the time when the packet can be transmitted may not include N2 or K2. As well, the $n^{th}$ transmission occasion may be further based on the time of the first transmission occasion, t0. The parameter t0 may be determined based on a time of a first scheduled transmission of the SPS, where the time may be determined based on contents or timing of an RRC message, a MAC CE, or a DCI associated with the SPS, e.g., a DCI triggering the SPS, etc. Thus, the nth transmission occasion may be determined to be the first slot after a time based on t0+n*p*T. If each of these factors are taken into consideration, the $n^{th}$ transmission occasion may be the first slot following a time that equals:

$$Time = t0 + n*p*T + offset.$$

The parameters, e.g., t0, p, m, n, T, and/or offset may be indicated to the UE by the base station. Some of the parameters may be based on default values, e.g., and the remaining subset of parameter values may be signaled to the UE in RRC messaging, etc.

The transmission occasion determined using these parameters may be based on a slot, a mini-slot, a DL centric slot, an UL centric slot, a set of symbols in a slot, or a combination thereof.

Although the first, second, third, and fourth aspects have been described in connection with DL transmissions using DL centric slots, a base station may similarly configure SPS(s), CS(s), or CG(s) for UL transmissions that are generated with a periodicity that has a non-integer relationship to the scheduling unit for the SP S/C S/CG.

Figure 8:
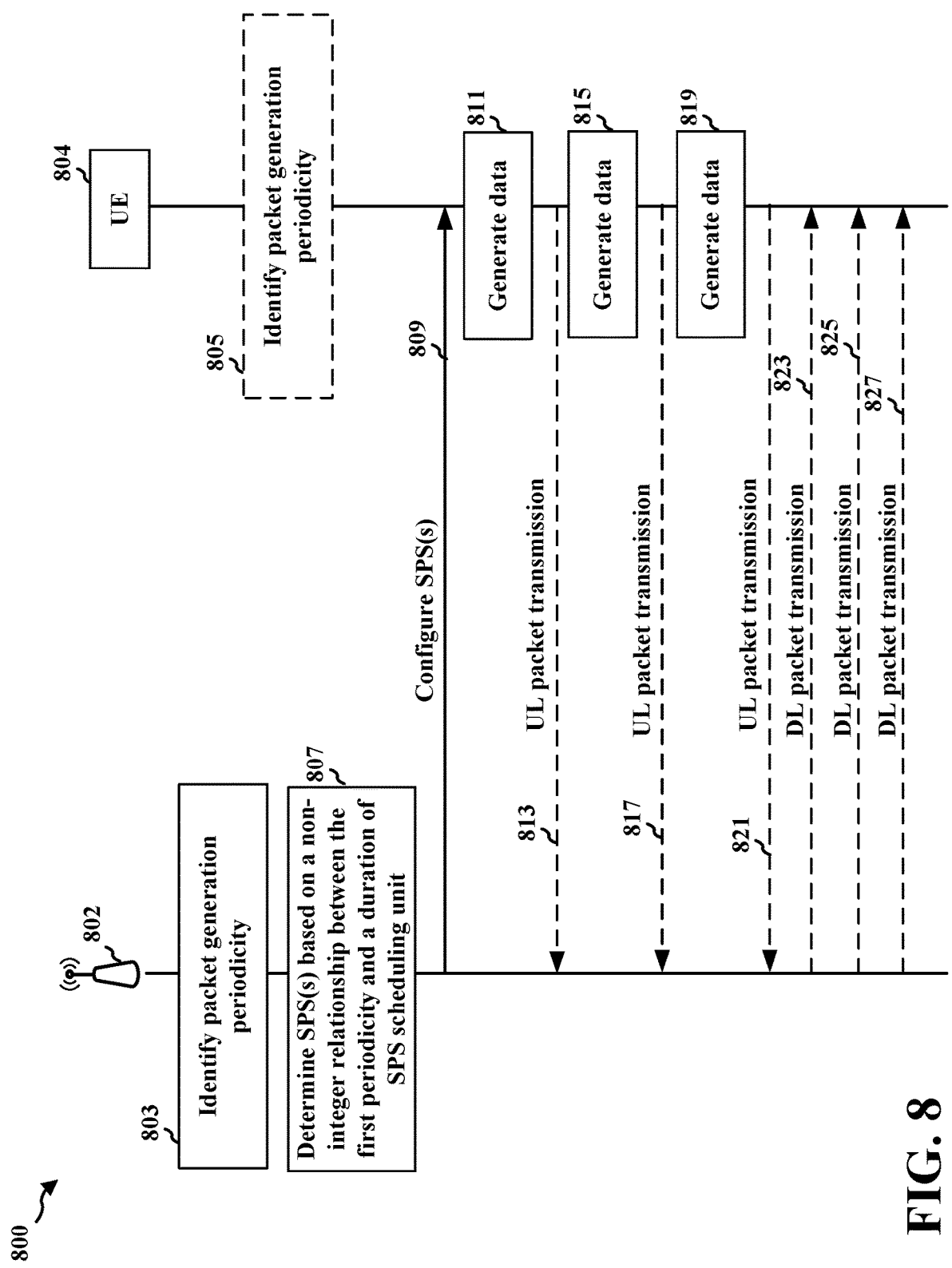
FIG. 8 illustrates an example of communication between a UE and a base station.

FIG. 8 illustrates an example 800 of communication between a base station 802 and a UE 804. The communication may be comprised as a part of factory automation. Thus, the base station 802 may correspond to a PLC. The UE 804 may comprise a sensor, an actuator, a piece of factory equipment, etc. In some examples, the communication between the base station and the UE may be based on 5G NR. In some examples, the communication may be performed in connection with factory automation, e.g., IIoT. As illustrated at 803, the base station 802 may identify a packet generation periodicity that has a non-integer relationship to the scheduling unit used to schedule SPS, CS, or CG. The scheduling unit may comprise a slot, a mini-slot, a DL centric slot, an UL centric slot, a symbol, a plurality of symbols, or another predefined duration. The packet generation may be for UL packets that are generated at the UE 804. The packet generation may be for DL packets that become ready for transmission from the base station 802 to the UE 804. At 807, the base station 802 determines parameters for SPS(s) (or CS(s)/CG(s)) based on the non-integer relationship between the traffic generation periodicity and the duration of the scheduling unit used to schedule the SPS(s)/CS(s)/CG(s).

At 809, the base station configures the UE 804 for the SPS(s)/CS(s)/CG(s). The configuration may provide an indication of dedicated resources, e.g., RBs, for the DL/UL transmission occasions. The configuration may be based on any of the first, second, third, or fourth aspects described herein. Thus, the configuration may have a period that is based on an integer number of slots, mini-slots, or symbols, wherein the integer number comprises a next lower integer than the non-integer relationship between the first periodicity and the duration of the scheduling unit. The configuration may be provided by the base station 802 to the UE 804, e.g., via an RRC message, a MAC CE, a DCI, etc. In another example, the configuration may have a period that is based on an integer number of slots, mini-slots, or symbols, wherein the integer number comprises a next lower integer than the non-integer relationship between the first periodicity and the duration of the scheduling unit. In another example, the configuration may comprise multiple, periodic SPS(s), CS(s), or CG(s), one for each periodic sub-sequence of a pattern based on the non-integer relationship. In another example, the configuration may comprise a single, non-periodic SPS/CS/CG, e.g., based on a determination of t0+n*p*T+offset.

For a configuration of an UL SPS/CS/CG, the UE 804 may identify a packet generation periodicity at which the UE 804 generates packets for UL transmission, e.g., at 805. The UE 804 may use this information in connection with information received from the base station 802 in order to determine a transmission occasion for transmitting a packet. When the configuration is for UL packet transmission, the UE 804 may periodically generate data, at 811, 815, and 819. The UE 804 may transmit the data to the base station at 813, 815, and 817 according to the configured SPS(s)/CS(s)/CG (s) from 809. The base station 802 may receive the transmissions at 813, 815, and 817 based on the configured SPS(s)/CS(s)/CG(s) from 809. As well, when the configuration at 809 is for DL transmissions from the base station, the UE may receive DL transmissions 823, 825, 827 according to the configured SPS(s)/CS(s)/CG(s) from 809.

Figure 9:
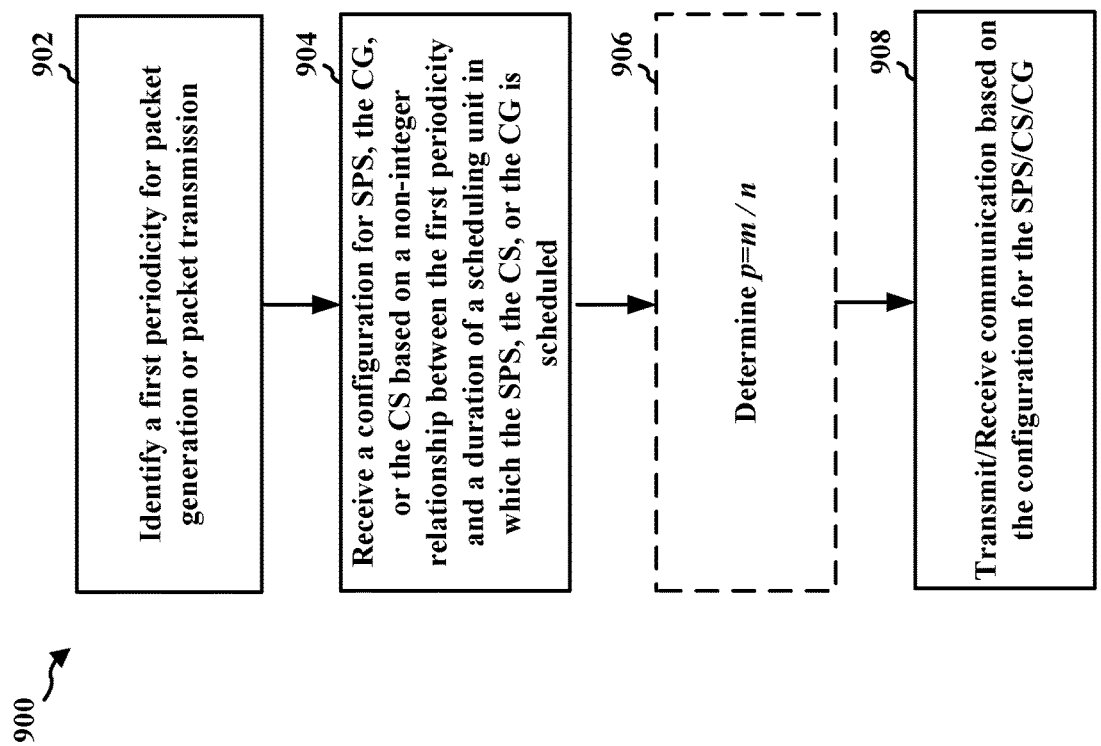
FIG. 9 is a flowchart of a method of wireless communication.

FIG. 9 is a flowchart 900 of a method of wireless communication. The method may be performed by a UE or a component of a UE (e.g., UE 104, 804, 1350; equipment 404; sensor/actuator 406; the apparatus 1002, 1002'; the processing system 1114, which may include the memory 360 and which may be the entire UE 350 or a component of the UE 350, such as the TX processor 368, the RX processor 356, and/or the controller/processor 359). The UE may be involved in factory automation, as described in connection with FIGS. 4 and 8. Thus, the UE may comprise a sensor, an actuator, a piece of factory equipment, etc. Optional aspects are illustrated with a dashed line. The aspects presented herein provide solutions to address the problem in which packets are generated having a periodicity that has a non-integer relationship with the size of a scheduling unit that is used to configure SP S/C S/CG.

At 902, the UE identifies a first periodicity for packet generation. For UL communication, the UE may identify a first periodicity for packet generation at the UE. For DL communication, the packets may be generated at a base station for DL transmission to the UE. The periodicity of the DL packet generation may be referred to as a periodicity of packet transmission from the base station, e.g., based on packets from the core network for transmission to the UE. The identification may be performed, e.g., by the packet generation component 1008 of the apparatus 1002.

At 904, the UE receives a configuration for a SPS, a CS, or a CG based on a non-integer relationship between the first periodicity and a duration of a scheduling unit in which the SPS, the CS, or the CG is scheduled. The configuration may be received, e.g., by the SPS/CS/CG component 1010 of the apparatus 1002. The configuration may be received from a base station, e.g., as described in connection with 809 in FIG. 8. The scheduling unit comprises at least one of a slot, a mini-slot, at least one symbol, or a preconfigured time duration. The configuration may be received in one or more of an RRC message, a MAC CE, or DCI.

In one example, the SPS, the CS, or the CG may comprise a non-periodic SPS, a non-periodic CG, or a non-periodic CS. As illustrated at 906, the UE may determine a positive rational number based on a first positive integer and a second positive integer indicated in the configuration, wherein the positive rational number is determined based on a ratio of the first positive integer and the second positive integer, e.g., p=m/n. The UE may then determine a transmission occasion for an $n^{th}$ scheduled transmission based on the positive rational number determined by the UE multiplied by the duration of the scheduling unit and multiplied by n, e.g., p*n*T. The transmission occasion for the nth scheduled transmission may be determined further based on a time of a first scheduled transmission of the configuration, e.g., t0+p*n*T. The first scheduled transmission may be based on information received in one or more of an RRC message, a MAC CE, or a DCI. The transmission occasion for the nth scheduled transmission may be determined further based on an offset, p*n*T+offset, wherein the offset is indicated in the configuration or is preconfigured. Thus, the nth transmission occasion may be based on t0+p*n*T+offset. Through the use of p, a single SPS/CS/CG can scheduled that meets the transmission needs according to the period of the packet generation without wasting resources through over provision or introducing latency through under provisioning and with a reduced overhead burden. The offset may be determined at least in part based on a delay between packet generation and packet transmission. The determination(s) may be performed, e.g., by the determination component 1012 of the apparatus 1002.

In another example, the configuration may comprise multiple periodic SPS, multiple periodic CS, or multiple periodic CG based on the non-integer relationship between the first periodicity and the duration of the scheduling unit in which the multiple periodic SPS, the multiple periodic CS, or the multiple periodic CG are scheduled. Each of the multiple periodic SPS, the multiple periodic CS, or the multiple periodic CG may correspond to a sub-sequence of transmission occasions of the packets based on the first periodicity. Each sub-sequence of the transmission occasions may comprise a third periodicity that is an integer multiple of the duration of the scheduling unit. An example of multiple SPS configurations is described in connection with FIG. 7. Through the use of multiple periodic SPS/CS/CG, transmissions occasions can scheduled that meet the transmission needs according to the period of the packet generation without wasting resources through over provision or introducing latency through under provisioning.

In another example, the configuration, at 904 may comprise a second periodicity comprising an integer number of slots, mini-slots, or symbols, wherein the integer number comprises a next lower integer than the non-integer relationship between the first periodicity and the duration of the scheduling unit. An example is described in connection with FIG. 6A. Rounding down may help to ensure that a transmission occasion is provided near the generation of the packet in a manner that avoids introducing latency into the communication.

In another example, the configuration, at 904 may comprise a second periodicity comprising an integer number of slots, mini-slots, or symbols, wherein the integer number comprises a next higher integer than the non-integer relationship between the first periodicity and the duration of the scheduling unit. An example is described in connection with FIG. 6B. Rounding up may avoid the waste of dedicated resources that may be over provisioned through rounding down to determine the period for the SPS/CS/CG.

At 908, the UE transmits UL packets based on the configuration for the SPS, the CG, or the CS received at 904. The transmission of the packets may be performed, e.g., by the transmission component 1006 of the apparatus 1002. If the configuration received at 904 is for DL communication, the UE may receive DL communication at 908. The reception of the packets may be performed, e.g., by the reception component 1004 of the apparatus 1002.

Figure 10:
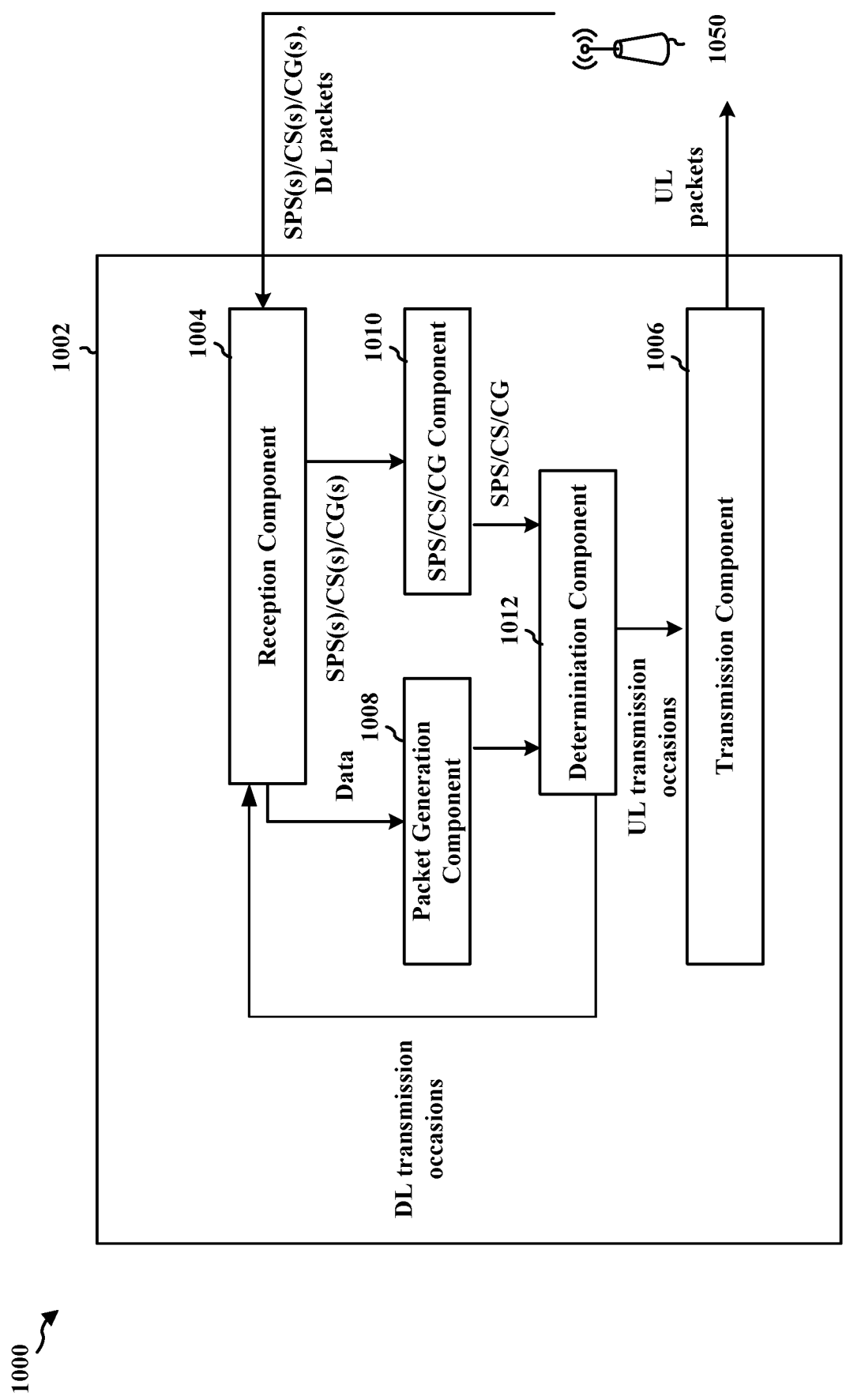
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE communicating with a base station 1050. The apparatus includes a reception component 1004 that receives DL communication from the base station 1050 and a transmission component 1006 that transmits UL communication to the base station. The apparatus includes a packet generation component 1008 that identifies a first periodicity for packet generation. For UL communication, the UE may identify a first periodicity for packet generation at the UE, e.g., as described in connection with 902 in FIG. 9. For DL communication, the packets may be generated at a base station for DL transmission to the UE, e.g., a periodicity for packet transmission from the base station. The apparatus includes an SPS/CS/CG component 1010 that receives a configuration for a SPS, a CS, or a CG based on a non-integer relationship between the first periodicity and a duration of a scheduling unit in which the SPS, the CS, or the CG is scheduled. The configuration may be received, e.g., as described in connection with 809 in FIGS. 8 and 904 in FIG. 9. The apparatus may include a determination component 1012 that determines transmission occasions for communication with the base station. For example, the determination component may determine UL transmission occasions for UL transmission according to the configuration received by the SPS/CS/CG component 1010. As one example, the determination component may determine a positive rational number based on a first positive integer and a second positive integer indicated in the configuration, wherein the positive rational number is determined based on a ratio of the first positive integer and the second positive integer, e.g., p=m/n. The determination component may then determine a transmission occasion for an $n^{th}$ scheduled transmission based on the positive rational number determined by the UE multiplied by the duration of the scheduling unit and multiplied by n, e.g., p*n*T. In another example, the determination component may determine multiple periodic SPS, as described in connection with FIG. 7. As another example, the determination component may determine the transmission occasion as in the examples described in connection with FIGS. 6A and 6B. When a transmission occasion is determined for an UL transmission, the transmission component 1006 may transmit UL packets or the reception component 1004 may receive DL packets based on the configuration for the SPS, the CG, or the CS. When the transmission occasion is determined for DL transmissions from the base station, the reception component 1004 may receive the DL transmissions based on the configuration for the SPS, the CS, or the CG.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
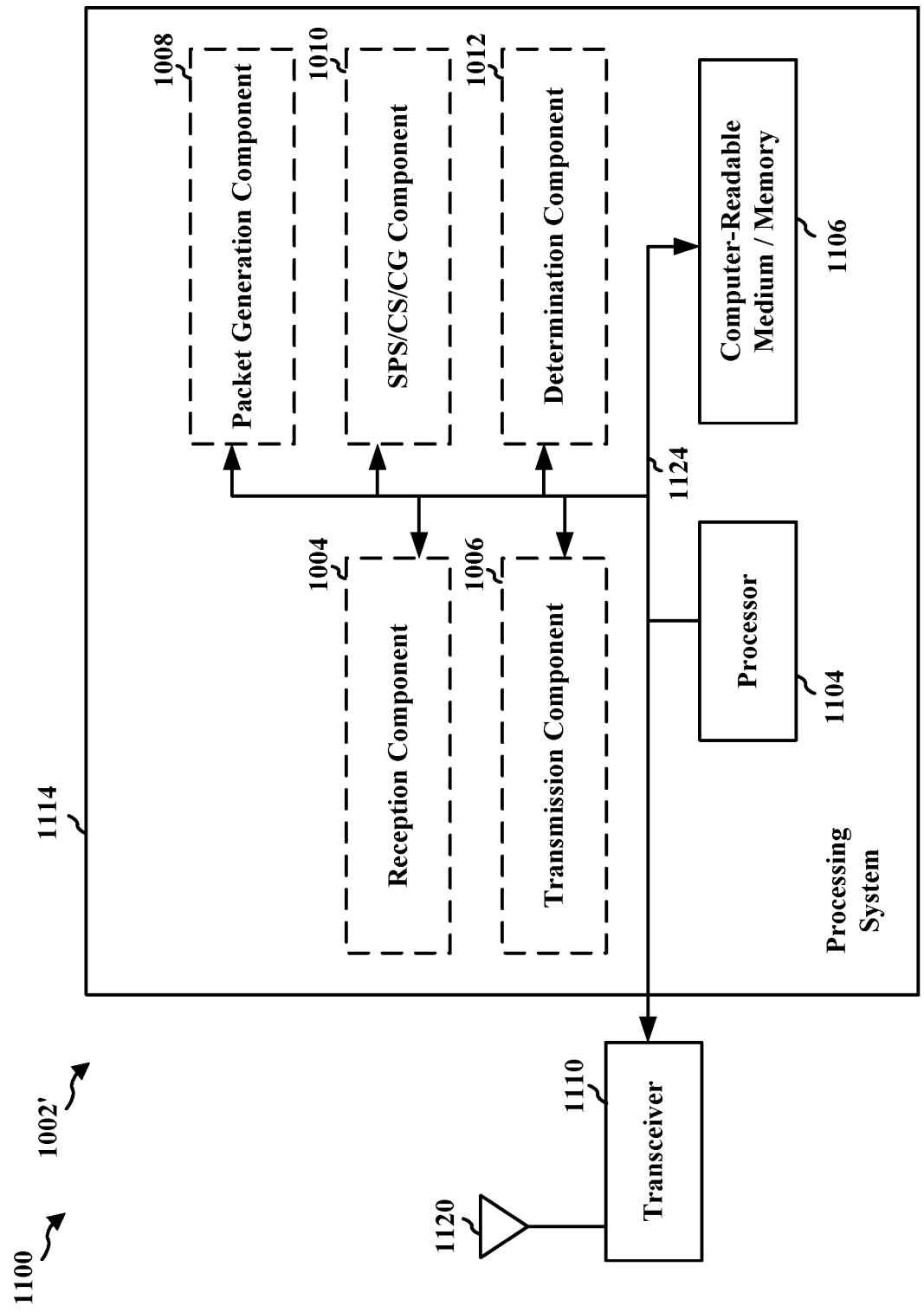
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternately, the processing system 1114 may comprise the entire UE, e.g., UE 104, 350.

In one configuration, the apparatus 1002/1002' for wireless communication includes means for identifying identifies a first periodicity for packet generation at a UE or packet transmission from a base station (e.g., at least packet generation component 1008) The apparatus may include means for receiving a configuration for a SPS, a CS, or a CG based on a non-integer relationship between the first periodicity and a duration of a scheduling unit in which the SPS, the CS, or the CG is scheduled (e.g., at least SPS/CS/CG component 1010). The apparatus may include means for determining a transmission occasion based on the configuration (e.g., at least determination component 1012). The apparatus may include means for determining a positive rational number based on a first positive integer and a second positive integer indicated in the configuration (e.g., at least determination component 1012). The apparatus may include means for transmitting UL packets based on the configuration for the SPS, the CG, or the CS (e.g., at least transmission component 1006). The apparatus may include means for receiving DL UL packets based on the configuration for the SPS, the CG, or the CS (e.g., at least reception component 1004). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
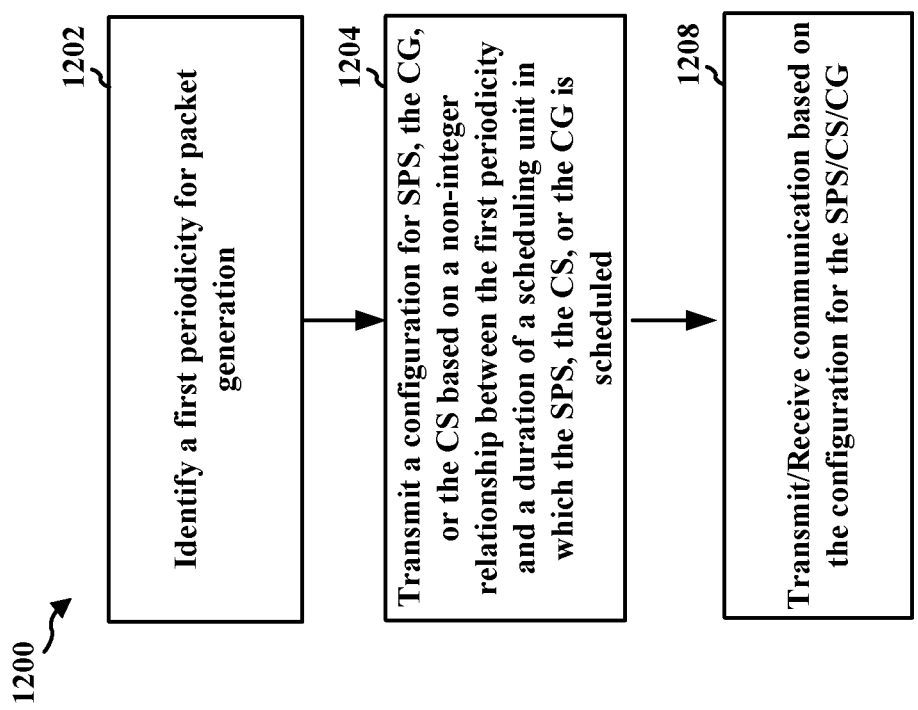
FIG. 12 is a flowchart of a method of wireless communication.

FIG. 12 is a flowchart 1200 of a method of wireless communication. The method may be performed by a base station or a component of a base station. The method may be performed, e.g., by a PLC. The base station may correspond to base station 102, 180, 310, 802, 1050; PLC 402; the apparatus 1302, 1302'; the processing system 1414, which may include the memory 376 and which may be the entire base station 310 or a component of the base station 310, such as the TX processor 316, the RX processor 370, and/or the controller/processor 375. The base station may be involved in factory automation, as described in connection with FIGS. 4 and 8. Thus, the base station may control factory equipment and may receive information from sensors/actuators, etc. Optional aspects are illustrated with a dashed line. The aspects presented herein provide solutions to address the problem in which packets are generated having a periodicity that has a non-integer relationship with the size of a scheduling unit that is used to configure SPS/CS/CG.

At 1202, the base station identifies a first periodicity for packet generation. For UL communication, the base station may identify a first periodicity for packet generation at the UE. For DL communication, the packets may be generated at a base station for DL transmission to the UE. The identification may be performed, e.g., by the packet periodicity component 1308 of the apparatus 1302.

At 1204, the base station transmits a configuration for a SPS, a CS, or a CG based on a non-integer relationship between the first periodicity and a duration of a scheduling unit in which the SPS, the CS, or the CG is scheduled. The configuration may be transmitted, e.g., by the SPS/CS/CG component 1310 of the apparatus 1302. The configuration may be transmitted, e.g., as described in connection with 809 in FIG. 8. The scheduling unit comprises at least one of a slot, a mini-slot, at least one symbol, or a preconfigured time duration. The configuration may be received in one or more of an RRC message, a MAC CE, or DCI.

In one example, the SPS, the CS, or the CG may comprise a non-periodic SPS, a non-periodic CG, or a non-periodic CS. The configuration may indicate a positive rational number based on a first positive integer and a second positive integer indicated in the configuration, wherein the positive rational number is determined based on a ratio of the first positive integer and the second positive integer, e.g., p=m/n. A transmission occasion for an $n^{th}$ scheduled transmission may be determined based on the positive rational number multiplied by the duration of the scheduling unit and multiplied by n, e.g., p*n*T. The transmission occasion for the nth scheduled transmission may be determined further based on a time of a first scheduled transmission of the configuration, e.g., t0. For example, the transmission occasion for the nth scheduled transmission may be based on t0+p*n*T. The first scheduled transmission may be based on information received in one or more of an RRC message, a MAC CE, or a DCI. The transmission occasion for the nth scheduled transmission may be determined further based on an offset, p*n*T+offset, wherein the offset is indicated in the configuration or is preconfigured. Thus, the nth transmission occasion may be based on t0+p*n*T+offset. Through the use of p, a single SPS/CS/CG can scheduled that meets the transmission needs according to the period of the packet generation without wasting resources through over provision or introducing latency through under provisioning and with a reduced overhead burden. The offset may be determined at least in part based on a delay between packet generation and packet transmission.

In another example, the configuration may comprise multiple periodic SPS, multiple periodic CS, or multiple periodic CG based on the non-integer relationship between the first periodicity and the duration of the scheduling unit in which the multiple periodic SPS, the multiple periodic CS, or the multiple periodic CG are scheduled. Each of the multiple periodic SPS, the multiple periodic CS, or the multiple periodic CG may correspond to a sub-sequence of transmission occasions of the packets based on the first periodicity. Each sub-sequence of the transmission occasions may comprise a third periodicity that is an integer multiple of the duration of the scheduling unit. An example of multiple SPS configurations is described in connection with FIG. 7. Through the use of multiple periodic SPS/CS/CG, transmissions occasions can scheduled that meet the transmission needs according to the period of the packet generation without wasting resources through over provision or introducing latency through under provisioning.

In another example, the configuration, at 904 may comprise a second periodicity comprising an integer number of slots, mini-slots, or symbols, wherein the integer number comprises a next lower integer than the non-integer relationship between the first periodicity and the duration of the scheduling unit. Rounding down may help to ensure that a transmission occasion is provided near the generation of the packet in a manner that avoids introducing latency into the communication.

In another example, the configuration, at 904 may comprise a second periodicity comprising an integer number of slots, mini-slots, or symbols, wherein the integer number comprises a next higher integer than the non-integer relationship between the first periodicity and the duration of the scheduling unit. Rounding up may avoid the waste of dedicated resources that may be over provisioned through rounding down to determine the period for the SPS/CS/CG.

At 1206, the base station receives UL packets based on the configuration for the SPS, the CG, or the CS transmitted at 1204. For example, the reception of packets may be performed by the reception component 1304 of the apparatus 1302. If the configuration transmitted at 1204 is for DL communication, the base station may transmit DL communication at 1206. For example, the transmission of packets may be performed by the transmission component 1306 of the apparatus 1302.

Figure 13:
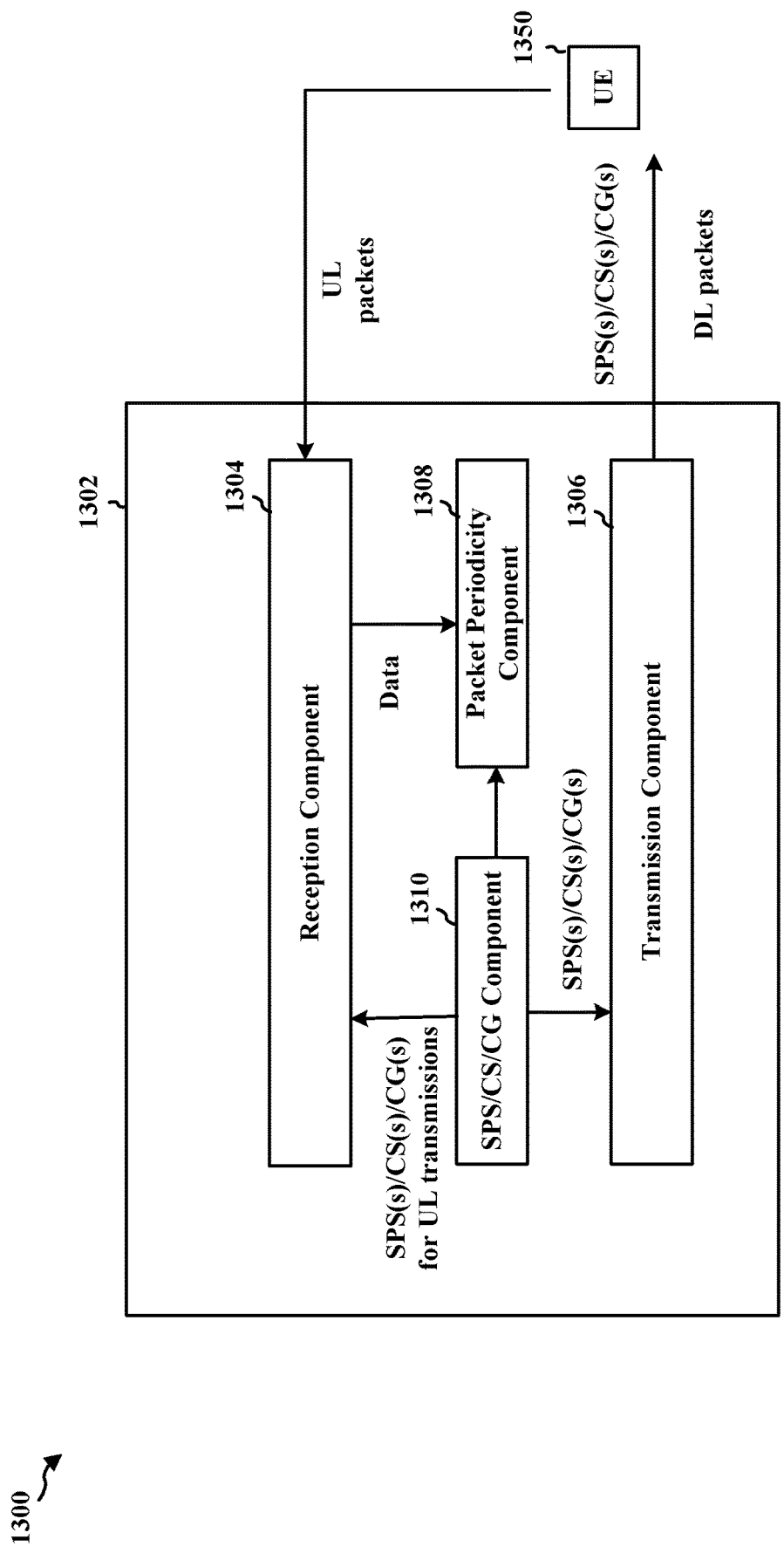
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station or a component of a base station in communication with UE 1350. The base station may be involved in factory automation, as described in connection with FIGS. 4 and 8. Thus, the base station may control factory equipment and may receive information from sensors/actuators, etc. The apparatus includes a reception component 1304 that receives UL communication from UE(s) 1350 and a transmission component 1306 that transmits DL communication to the UE(s) 1350. The apparatus includes a packet periodicity component 1308 that identifies a first periodicity for packet generation or packet transmission, as described in connection with 1202 in FIG. 12. The apparatus includes an SPS/CS/CG component 1310 that transmits a configuration for a SPS, a CS, or a CG based on a non-integer relationship between the first periodicity and a duration of a scheduling unit in which the SPS, the CS, or the CG is scheduled, e.g., as described in connection with 809 in FIGS. 8 and 1204 in FIG. 12. When the configuration is for an UL transmission, the reception component 1004 may receive UL packets based on the configuration for the SPS, the CG, or the CS. When configuration is for DL transmissions from the base station, the transmission component 1006 may transmit the DL transmissions based on the configuration for the SPS, the CS, or the CG.

The apparatus may include additional components that perform each of the blocks of the algorithm in the aforementioned flowcharts of FIGS. 8 and 12. As such, each block in the aforementioned flowcharts of FIGS. 8 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
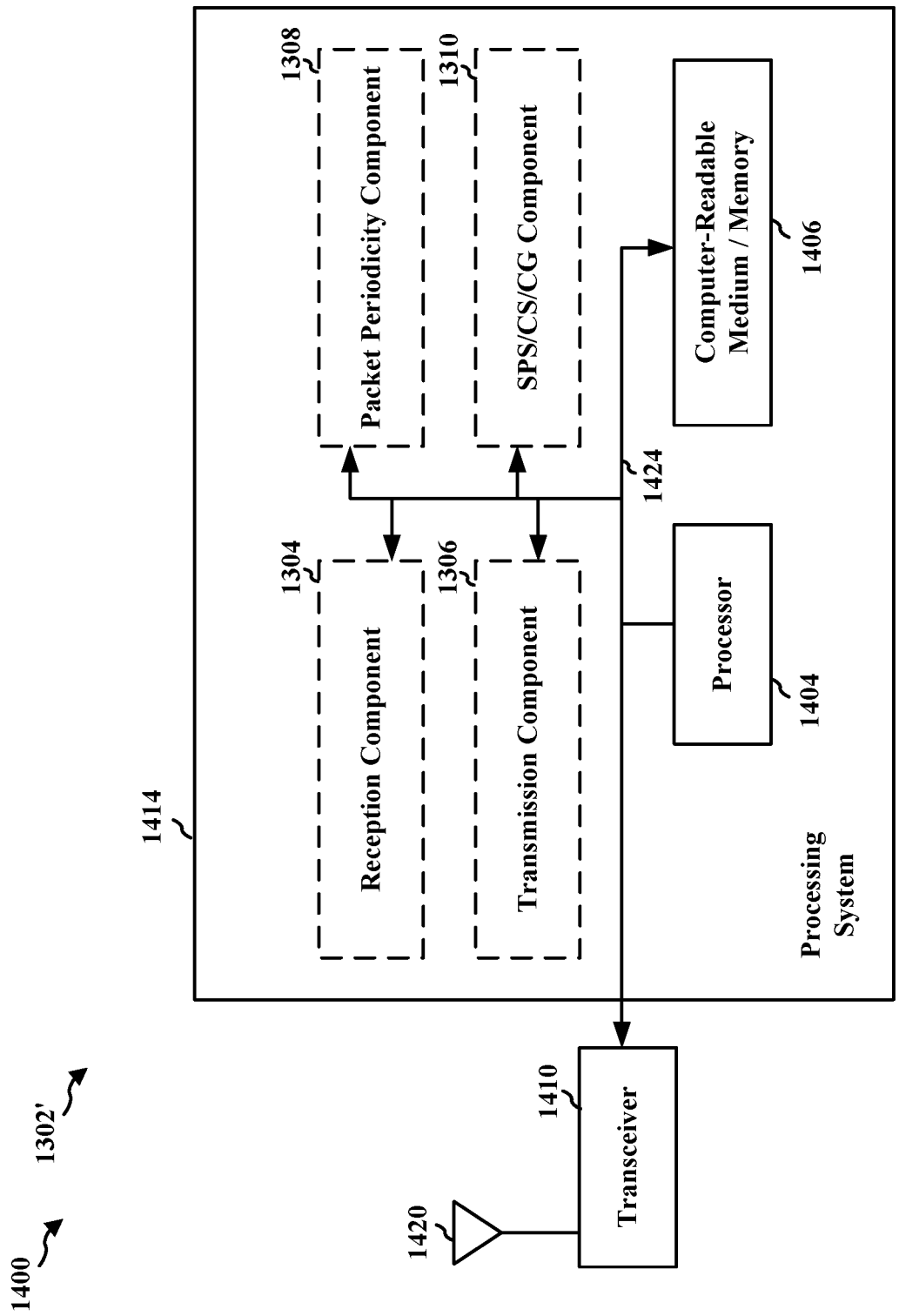
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternately, the processing system 1414 may comprise the entire base station, e.g., base station 102, 180, 310.

In one configuration, the apparatus 1302/1302' for wireless communication includes means for identifying a first periodicity for packet generation at a UE or packet transmission by a base station (e.g., at least periodicity component 1308). The apparatus may include means for transmitting a configuration to the UE for a SPS, CS, or CG based on a non-integer relationship between the first periodicity and a duration of a scheduling unit in which the SPS, the CS, or the CG is scheduled (e.g., at least SPSCS/CG component 1310). The apparatus may include means for receiving or transmitting packets based on the configuration for the SPS, the CS, or the CG (e.g., at least reception component 1304 and/or transmission component 1306). The apparatus may include means for transmitting receiving packets to the UE based on the configuration for the SPS, the CS, or the CG (e.g., at least the transmission component 1306). The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   identifying a first periodicity for packet generation at the UE or packet transmission from a base station to the UE;
   receiving a configuration for a Semi-Persistent Scheduling (SPS), a Configured Scheduling (CS), or a Configured Grant (CG) based on a non-integer relationship between the first periodicity and a duration of a scheduling unit in which the SPS, the CS, or the CG is scheduled, the configuration indicating a first positive integer and a second positive integer; and
   transmitting or receiving packets based on a positive rational number that is based on a ratio of the first positive integer and the second positive integer indicated in the configuration for the SPS, the CS, or the CG.

2. The method of claim 1, wherein the scheduling unit comprises at least one of a slot, a mini-slot, at least one symbol, or a preconfigured time duration.

3. The method of claim 1, wherein the SPS, the CS, or the CG comprises a non-periodic SPS, a non-periodic CS, or a non-periodic CG.

4. The method of claim 1, further comprising:
   determining a transmission occasion for an $n^{th}$ scheduled transmission based on the positive rational number determined by the UE multiplied by the duration of the scheduling unit and multiplied by n, n being a positive integer.

5. The method of claim 4, wherein the transmission occasion for the nth scheduled transmission is determined further based on a time of a first scheduled transmission of the configuration.

6. The method of claim 5, wherein the first scheduled transmission is based on information received in one or more of a Radio Resource Control (RRC) message, a Medium Access Control (MAC) layer Control Element (CE), or Downlink Control Information (DCI).

7. The method of claim 4, wherein the transmission occasion for the nth scheduled transmission is determined further based on an offset, wherein the offset is indicated in the configuration or is preconfigured.

8. The method of claim 1, wherein the configuration is received in one or more of a Radio Resource Control (RRC) message, a Medium Access Control (MAC) layer Control Element (CE), or Downlink Control Information (DCI).

9. The method of claim 1, wherein the configuration is transmitted in one or more of a Radio Resource Control (RRC) message, a Medium Access Control (MAC) layer Control Element (CE), or Downlink Control Information (DCI).

10. A method of wireless communication at a user equipment (UE), comprising:
    receiving a configuration for multiple periodic Semi-Persistent Scheduling (SPS), multiple periodic Configured Scheduling (CS), or multiple periodic Configured Grant (CG) based on a non-integer relationship between:
    a duration of a scheduling unit in which the multiple periodic SPS, the multiple periodic CS, or the multiple periodic CG are scheduled, and
    a first periodicity for packet generation at the UE or packet transmission from a base station to the UE,
    wherein each of the multiple periodic SPS, the multiple periodic CS, or the multiple periodic CG comprises a second periodicity and corresponds to a sub-sequence of transmission occasions of the packets based on the first periodicity; and
    transmitting or receiving packets based on the configuration for the SPS, the CS, or the CG.

11. The method of claim 10, wherein the second periodicity is an integer multiple of the duration of the scheduling unit.

12. A method of wireless communication at a user equipment (UE), comprising:
    identifying a first periodicity for packet generation at the UE or packet transmission from a base station to the UE;
    receiving a configuration for a Semi-Persistent Scheduling (SPS), a Configured Scheduling CS), or a Configured Grant (CG) based on a non-integer relationship between the first periodicity and a duration of a scheduling unit in which the SPS, the CS, or the CG is scheduled, wherein the configuration comprises a second periodicity comprising an integer number of slots, mini-slots, or symbols, the integer number corresponding to a next lower integer or a next higher integer than the non-integer relationship between the first periodicity and the duration of the scheduling unit; and
    transmitting or receiving packets based on the configuration for the SPS, the CS, or the CG.

13. The method of claim 12, wherein the integer number of the slots, the mini-slots, or the symbols comprises the next higher integer than the non-integer relationship between the first periodicity and the duration of the scheduling unit.

14. The method of claim 12, wherein the integer number of the slots, the mini-slots, or the symbols comprises the next lower integer than the non-integer relationship between the first periodicity and the duration of the scheduling unit.

15. An apparatus for wireless communication at a User Equipment (UE), comprising:
    a memory; and
    at least one processor coupled to the memory and configured to:
    identify a first periodicity for packet generation at the UE or packet transmission from a base station to the UE;
    receive a configuration for a Semi-Persistent Scheduling (SPS), a Configured Scheduling (CS), or a Configured Grant (CG) based on a non-integer relationship between the first periodicity and a duration of a scheduling unit in which the SPS, the CS, or the CG is scheduled, the configuration indicating a first positive integer and a second positive integer; and
    transmit or receive packets based on a positive rational number that is based on a ratio of the first positive integer and the second positive integer indicated in the configuration for the SPS, the CS, or the CG.

16. A method of wireless communication, comprising:
    identifying a first periodicity for packet generation at a user equipment (UE) or packet transmission by a base station to the UE;

transmitting a configuration to the UE for a Semi-Persistent Scheduling (SPS), Configured Scheduling (CS), or Configured Grant (CG) based on a non-integer relationship between the first periodicity and a duration of a scheduling unit in which the SPS, the CS, or the CG is scheduled, the configuration indicating a first positive integer and a second positive integer; and receiving or transmitting packets based on a positive rational number that is based on a ratio of the first positive integer and the second positive integer indicated in the configuration for the SPS, the CS, or the CG.

17. The method of claim 16, wherein the scheduling unit comprises at least one of a slot, a mini-slot, at least one symbol, or a preconfigured time duration.

18. The method of claim 16, wherein the SPS, the CS, or the CG comprises a non-periodic SPS, a non-periodic CS, or a non-periodic CG.

19. The method of claim 16, wherein a transmission occasion for an $n^{th}$ scheduled transmission is based on the positive rational number multiplied by the duration of the scheduling unit and multiplied by n, n being a positive integer.

20. The method of claim 19, wherein the transmission occasion for the nth scheduled transmission is further based on a time of a first scheduled transmission of the configuration, wherein the first scheduled transmission is based on information transmitted in one or more of a Radio Resource Control (RRC) message, a Medium Access Control (MAC) layer Control Element (CE), or Downlink Control Information (DCI).

21. The method of claim 19, wherein the transmission occasion for the nth scheduled transmission is further based on an offset, wherein the offset is indicated in the configuration or is preconfigured.

22. The method of claim 21, wherein the offset is determined at least in part based on a delay between the packet generation at the UE and packet transmission by the UE.

23. A method of wireless communication, comprising:
identifying a first periodicity for packet generation at a user equipment (UE) or packet transmission by a base station to the UE;
transmitting a configuration to the UE for multiple periodic Semi-Persistent Scheduling (SPS), multiple periodic Configured Scheduling (CS), or multiple periodic Configured Grant (CG) based on a non-integer relationship between:
a duration of a scheduling unit in which the multiple periodic SPS, the multiple periodic CS, or the multiple periodic CG are scheduled, and
the first periodicity for the packet generation at the UE or the packet transmission from the base station to the UE,
wherein each of the multiple periodic SPS, the multiple periodic CS, or the multiple periodic CG comprises a second periodicity and corresponds to a sub-sequence of transmission occasions of the packets based on the first periodicity; and transmitting or receiving packets based on the configuration for the SPS, the CS, or the CG.

24. The method of claim 23, wherein the second periodicity that is an integer multiple of the duration of the scheduling unit.

25. A method of wireless communication, comprising:
identifying a first periodicity for packet generation at a user equipment (UE) or packet transmission by a base station to the UE;
transmitting a configuration to the UE for multiple periodic Semi-Persistent Scheduling (SPS), multiple periodic Configured Scheduling (CS), or multiple periodic Configured Grant (CG) based on a non-integer relationship between:
a duration of a scheduling unit in which the multiple periodic SPS, the multiple periodic CS, or the multiple periodic CG are scheduled, and
the first periodicity for the packet generation at the UE or the packet transmission from the base station to the UE,
wherein the configuration comprises a second periodicity comprising an integer number of slots, mini-slots, or symbols, wherein the integer number of the slots, the mini-slots, or the symbols comprises a next lower integer or a next higher integer than the non-integer relationship between the first periodicity and the duration of the scheduling unit; and
transmitting or receiving packets based on the configuration for the SPS, the CS, or the CG.

26. The method of claim 25, wherein the integer number comprises the next higher integer than the non-integer relationship between the first periodicity and the duration of the scheduling unit.

27. The method of claim 25, wherein the integer number of the slots, the mini-slots, or the symbols comprises the next lower integer than the non-integer relationship between the first periodicity and the duration of the scheduling unit.

28. An apparatus for wireless communication, comprising:
a memory; and
at least one processor coupled to the memory and configured to:
identify a first periodicity for packet generation at a user equipment (UE) or packet transmission by a base station to the UE;
transmit a configuration to the UE for a Semi-Persistent Scheduling (SPS), Configured Scheduling (CS), or Configured Grant (CG) based on a non-integer relationship between the first periodicity and a duration of a scheduling unit in which the SPS, the CS, or the CG is scheduled, the configuration indicating a first positive integer and a second positive integer; and
receive or transmit packets based on a positive rational number that is based on a ratio of the first positive integer and the second positive integer indicated in the configuration for the SPS, the CS, or the CG.

* * * * *